United States Patent [19]
Danielson

[11] Patent Number: 5,154,582
[45] Date of Patent: Oct. 13, 1992

[54] ROUGH VACUUM PUMP USING BULK GETTER MATERIAL

[75] Inventor: Philip Danielson, Downers Grove, Ill.

[73] Assignee: Danielson Associates, Inc., Lisle, Ill.

[21] Appl. No.: 748,273

[22] Filed: Aug. 21, 1991

Related U.S. Application Data

[63] Continuation-in-part of Ser. No. 747,667, Aug. 20, 1991.

[51] Int. Cl.$^5$ ............................................. F04B 37/02
[52] U.S. Cl. ...................................................... 417/51
[58] Field of Search ....................... 313/553; 417/48, 51

[56] References Cited

U.S. PATENT DOCUMENTS

| | | | |
|---|---|---|---|
| 3,225,910 | 12/1965 | Della Porta . | |
| 3,579,459 | 5/1971 | Della Porta et al. . | |
| 3,584,253 | 6/1971 | Wintzer . | |
| 3,603,704 | 9/1971 | Zucchinelli et al. . | |
| 3,609,062 | 9/1971 | Zucchinelli et al. . | |
| 3,609,064 | 9/1971 | Girgi et al. | 417/51 |
| 3,662,522 | 5/1972 | Della Porta et al. | 55/387 |
| 3,780,501 | 12/1973 | Della Porta et al. | 55/208 |
| 3,857,680 | 12/1974 | Della Porta et al. | 23/288 K |
| 3,961,897 | 6/1976 | Giorgi et al. | 23/252 R |
| 3,973,157 | 8/1976 | Girgi et al. | 313/353 |
| 4,088,456 | 5/1978 | Giorgi et al. | 55/179 |
| 4,137,012 | 1/1979 | Della Porta et al. | 417/51 |
| 4,312,669 | 1/1982 | Boffito et al. | 75/177 |
| 4,743,167 | 5/1988 | Martelli et al. | 417/51 |

OTHER PUBLICATIONS

"Enhanced UHV Performance with Zirconium-Based Getters", Solid State Technology, Sep. 1990, pp. 77–80.
"Operating Instructions for Sorb-AC Cartridge Pumps", SAES Getters S.p.A., Milano, Italy; Mar. 1986.
"ST 707 Non-Evaporable Getters Activatable at Low Temperatures", SAES Getters S.p.A., Milan, Italy; Apr. 1987.

*Primary Examiner*—Leonard E. Smith
*Attorney, Agent, or Firm*—Milton S. Gerstein; Marvin N. Benn

[57] ABSTRACT

A bulk getter-pump, consisting primarily of large beds of heated getter-material for use in pumping down a vacuum chamber to a rough vacuum. The pump is designed for applications now are served by turbo, cryo, diffusion, and ion pumps. The pump consists of a meshed cage filled with bulk getter-material pellets, which cage is housed in a housing coupled to a conduit of a vacuum chamber, so that the bulk getter-material is exposed to the interior of the vacuum chamber. In use, a roughing pump is first used to bring the chamber down to a pressure of about 2 torr, and then the bulk getter-pump of the invention is operatively coupled to the chamber for sorbing gases, in order to reach a desired vacuum.

8 Claims, 2 Drawing Sheets

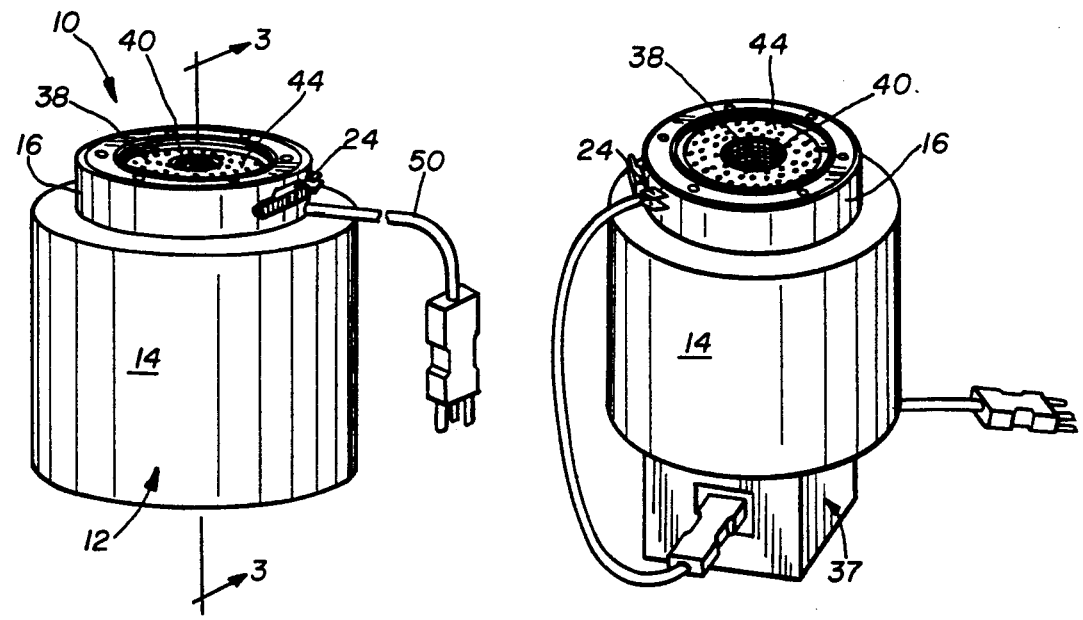
FIG. 1
FIG. 2
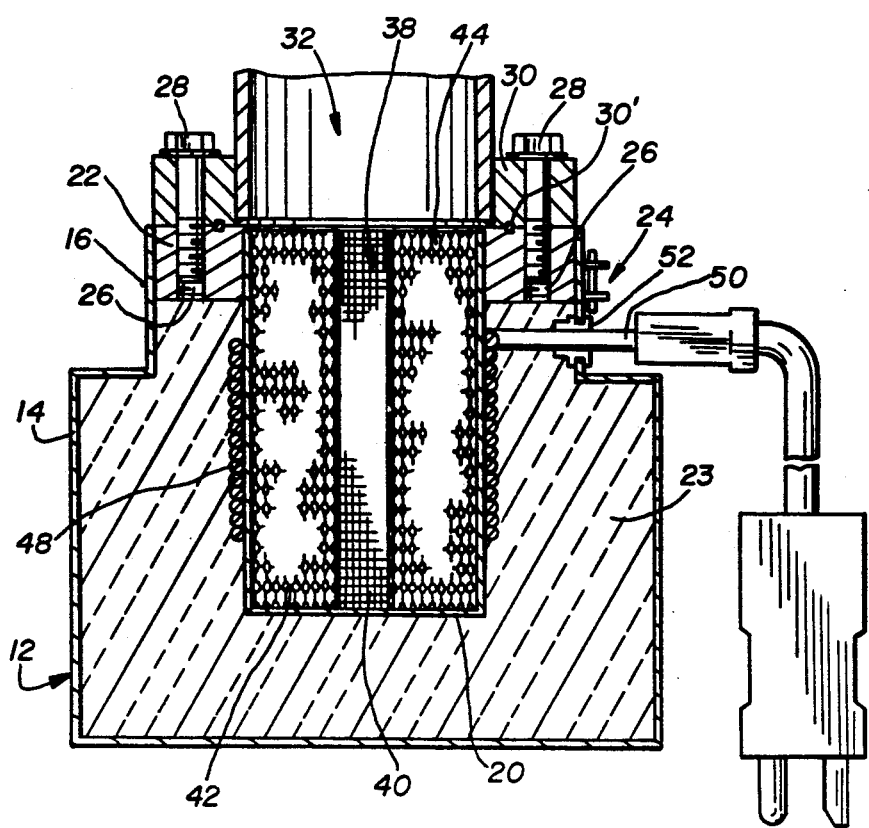
FIG. 3

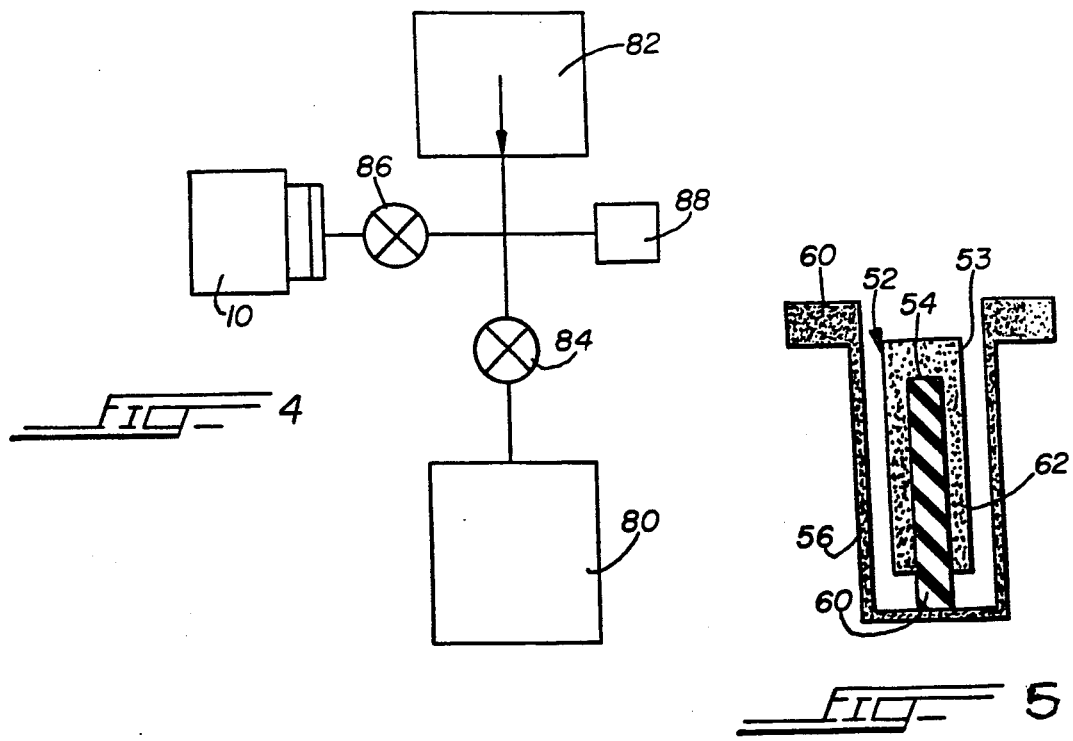

ROUGH VACUUM PUMP USING BULK GETTER MATERIAL

CROSS REFERENCE TO RELATED APPLICATION

The present application is a continuation-in-part of application Ser. No. 07/747,667, filed on Aug. 20, 1991.

BACKGROUND OF THE INVENTION

Most industrial and semiconductor vacuum processes are performed in high vacuum environments, where pressures are between $10^{-4}$ to $10^{-8}$ torr. Ultra-high vacuums, where pressures are below $10^{-8}$ torr, often use the technique called "Getter Pumping". The present invention has advanced the use of the Getter pumping technique into rough-vacuum applications, with significant performance-advantages over conventional pumping techniques.

Gettering is a process that pumps or purifies gases by chemical reaction with an active metal material. For example, oxygen is pumped by forming a metallic oxide. Getter material will not pump inert gases such as helium, argon, krypton, neon or xenon. Evaporable getters are presently in use in the vacuum industry for pumping. In this case, the getter material, usually titanium, is deposited by evaporation onto a substrate, such as the lid of a vacuum chamber, as a thin film. The thin film is quickly used up by reaction, and must be constantly replaced, in the pressure range of between $10^{-3}$ to $10^{-7}$ torr. In fact, it is difficult to replace the film fast enough to use in this pressure range, so this process is generally only used at ultrahigh vacuum (below $10^{-7}$ torr), where there are fewer molecules requiring pumping.

Non-evaporable getters are materials that can be used by heating a solid material to temperatures high enough to make it react with the active gases to be pumped. In general, the gases will react on the surface of the getter material, and then slowly migrate into the bulk or body of the getter material. The temperature of a given getter material will control both the rate of reaction and the speed at which the migration occurs. A new charge of getter will be covered with reacted material and will require "activation" before it will pump efficiently. In most cases, this requires a short heating cycle that is at a higher temperature than the operating temperature. The pumping speed of the pump is dependent upon the amount of getter material available for reaction, and the amount of surface area available for reaction.

As stated above, the use of getter-materials as vacuum-pumping vehicles is well-known. The "gettering" process has been around since the early days of the electron tube industry. Materials that react with chemically-active gases to produce low, vapor-pressure compounds were placed in electron tubes to "get" the gases. The term has survived, as did the terms "getters" and "gettering".

Getter-materials are used in many products and processes where one needs to maintain a vacuum against small gas-loads. Sputter-ion pumps and titanium sublimation-pumps use getter-materials in their operation. Strip-mounted films of getter-material also are used as hydrogen pumps in accelerators. The common thread that runs through these gettering systems is that each is a relatively low-throughput device that is ideally suited for clean, ultra-high vacuum processors, where gas-loads are low.

As stated above, getter-pumps may be divided into two basic types: Deposited film (evaporable) or stable state (non-evaporable). Deposited-film, evaporable getters are the more common of the two. As explained above, thin films of getter-material are deposited on host surfaces, such as a chamber wall, where the gettering action takes place. These surfaces are at room temperature, or are cooled below room temperature. The deposited (getter) films are formed by sputtering, as in sputter-ion pumps, or by evaporation, as in sublimation pumps. Titanium is the most commonly deposited getter material. Unfortunately, these films are quickly used up by reaction with the pumped active gases, and must be continually renewed. This means that the gasload the film is expected to pump is proportional to the rate of renewal needed for the film material. Although deposited films are perfectly capable of pumping a system down to high vacuum from roughing pressure, they have difficulty in meeting a steady gas-load at these pressures. These films also have lower pumping speeds at conventional roughing pressures, so they are difficult and time-consuming to use during the first part of a pump-down cycle. Deposited films do not reach their best performance-levels until ultra-high vacuum (UHV) levels are reached. In addition, they require a significant surface area upon which to be deposited. Although deposited-film getters are clean, their low throughput in high vacuum is compounded by their need for large host surfaces. This usually results in peeling and powdering of the exhausted films, necessitating frequent cleaning of the pump.

The second type, steady-state, or non-evaporable, stable getter pumps use the same pumping mechanism as the thin-film getters, in that they react with the active gases to be pumped. But their similarity stops there. Steady-state getter material remain as solid forms that continually sorb the gases. Normally, these materials are heated during operation. Heat helps diffuse the pumped, active gases into the bulk of the getter-material, which then continually exposes fresh getter-material surfaces. Steady-state getter-materials are commercially available in strip form, where a getter-film is bonded to a support strip, or in bulk forms, such as pills, pellets, or chunks. As in all gettering systems, a solid-state getter-material has a finite ability to sorb gases before it becomes saturated.

As stated before, most commercial vacuum processes only require high vacuum, not ultra-high vacuum, and, therefore have not used the getter-pumping method, because of the disadvantages summarized above. These high-vacuum (HV) commercial processes require short pump-down times and repeated pump-down cycles between process-loads. In many processes, however, fast pump-down is not enough. Cleanliness of the pumping process also is vital, as more stringent processes are developed.

Conventional, non-gettering, pumping techniques typically employ an oil-sealed mechanical pump, which cannot easily reach roughing pressures below several millitorr. The amount of gas that any getter-pumping system would have to sorb at these relatively-high pressures would exhaust its ability to pump, if it had to pump down repeatedly from these high pressures. An oil-sealed, mechanical pump requires an additional high-vacuum pump, such as a turbomolecular pump, to reach lower pressures before any gettering pump could be employed. Molecular-drag pump technology changed this by not only providing cleaner roughing, but by also allowing roughing pressures of $10^{-4}$ to $10^{-6}$ torr to be routinely achieved. Roughing to these pressures has opened a new application for getter pumping. Experiments with a small, strip getter-pump demonstrated that one can easily and quickly evacuate a chamber when roughing pressures are reduced below $10^{-4}$ torr. However, there is a problem with using a molecular-drag pump/getter strip pump system for industrial processes. When the pump has to re-evacuate the chamber shortly after it has been opened to air between process cycles, the throughput becomes limited. This limitation is traceable to the amount of surface area of getter material available for pumping. When the pump meets a steady-gas load, the getter surface becomes covered with reacted gas, which diffuses into the bulk of the material at a rate governed by its composition and temperature. If the surfaces are in equilibrium with a small gas load, the surface will not be able to recover its full pumping speed quickly enough to deal with a higher gas load when the system is opened to air and roughed down quickly.

SUMMARY OF THE INVENTION

It is the primary objective of the present invention to provide a gettering pump that may be used effectively and continuously in a rough-vacuum environment in the pressure range of between 2 torr and $10^{-5}$ torr.

It is another objective of the present invention to provide such a gettering pump for use in rough-vacuum applications that will sorb gases at a fast enough rate so as to meet the steady-state process requirements associated with any rough-vacuum application.

According to the present invention, a gettering pump is provided for use in rough-vacuum applications without the drawbacks and adverse characteristics described above.

A bulk getter-pump, consisting primarily of large beds of heated getter-material, has been specifically developed for processes, such as sputtering and evaporation, that require high pumping speeds and throughput in a rough-vacuum environment. These bulk getter-pumps are completely solid-state devices. There is no possible oil contamination, no vibration, and no sound. They produce no magnetic fields, and are not affected by magnetic fields. They are designed for applications that now are served by turbo, cryo, diffusion, and ion pumps. The main thrust of the invention is to provide pumping of large gas loads in a rough-vacuum region.

The bulk getter-pump of the invention may be used in unique applications, such as a sputtering process, which can be performed without the need to continually flow argon gas. If the getter-material is kept hot, the pump of the invention will pump any contaminant gases that are introduced with the argon or released by the process; however, the argon will not be pumped away, so flow meters and flow controllers are not required.

BRIEF DESCRIPTION OF THE DRAWINGS

The invention will be more readily understood with reference to the accompanying drawing, wherein:

FIG. 1 is a front, isometric view of the gettering-pump for use in rough-vacuum applications according to the invention;

FIG. 2 is a rear, isometric view of the gettering-pump for use in rough-vacuum applications according to the invention;

FIG. 3 is a cross-sectional view taken along line 3—3 of FIG. 1;

FIG. 4 is a schematic view showing the gettering pump of the invention in combination with a mechanical, roughing pump;

FIG. 5 is a cross-sectional, side view showing a modification of the getter pump of the invention in which the external heater is received within a well formed in the cage of the pump holding the bulk getter-material.

DETAILED DESCRIPTION OF THE INVENTION

Referring now to the drawings in greater detail, the getter-pump for rough-vacuum applications is indicated generally by reference numeral 10. The getter-pump 10 has a main, sealed, outer housing 12 defining a lower cylindrically-shaped portion 14 and an upper, smaller-diameter, cylindrically-shaped, clamping-ring portion 16. The housing 12 mounts therein a getter-pump body housing 20 that is also cylindrical in shape. The pump-body housing 20 is mounted in the main housing 12 by an integral, annular, mounting flange-member 22 that is removably secured to the interior of the upper clamping-ring portion 16 via a clamp 24. The clamping-ring portion 16 is a split ring with the clamp 24 holding the ends thereof together for holding the ring fast to the flange-member 22. The flange-member 22 has a pair of oppositely-disposed holes 26 for threadingly-receiving a pair of bolts 28, whereby another, mating, annular, 2¾ inch, Conflat flange-member 30 of a conduit section 32 may be secured to the flange-member 22 in a face-to-face manner, as clearly shown in FIG. 3. An annular seal 30' provides a sealed connection. With the two flanges secured to each other, the interior of the conduit section 32 is in coaxial, linear alignment with the interior of the pump-body housing 20. The conduit-section 32 is coupled at its other, distal end (not shown) to a vacuum chamber or vessel which is to be pumped down to a rough vacuum in the range between 2 torr and $10^{-5}$ torr by the pump 10 of the invention, after such chamber or vessel has been initially pumped down by a conventional roughing pump, as described below in greater detail. The interior volume of the housing 12 is provided with heat-insulating material 23 that surrounds the pump-body housing 20. Positioned within the pump-body housing 20 is a removable, circular cross-sectioned, screen-cage 38 made of wire-mesh. The cage 38 has a central, tubular support member 40 that is surrounded by an annular, getter-material storage, volume-section 42 that is filled with getter-material 44 in bulk form, such as pellets, pills, and the like. The particular type of getter-material depends upon the gas to be sorbed thereby, which is well-known in the art. The height of the cage 38 is substantially the same as the height of the pump-body housing 20. The screen mesh and the hollow tubular central section 40 allow for the greatest possible surface-area exposure of the bulk getter-material, so as to increase the getter-pumping of the pump, and its sorption of gases, in order to create and sustain a rough vacuum in a vacuum vessel or chamber. Operatively associated with the getter-pump body 20 is an annular band-heater device defining a series of annular coil-segments 48 by which the pump-body housing 20 may be heated, whereby the bulk getter-material 44 may be kept at a desired temperature. The coils are powered via a power cord 50 passing through an opening 52 formed in a portion of the annular surface of the lower housing portion 14. A stand-alone power-unit 37, as shown in FIG. 2, may be provided for supplying the power to the coils and for controlling the "on" and "off" states of the heater.

The getter-materials used are porous and pellet-shaped, and are about the size of small aspirin tablets, so as to increase the working surface area. They may also contain a bed of pellets, pills or chunk getter materials, or a mixture of these getter-materials. This large amount of getter-material allows a correspondingly large amount of gas to be pumped in total, which results in a long use-period before the getter-material is totally reacted and has to be replaced.

In one version of the device 10, getter-pellets are placed in a 3.8 cm. diameter cage-cylinder 42 with the upper end portion of the pump-body housing 20 being welded to the flange 22. In a process mode, the getter-material 44 in the bulk pump is heated to 280 degrees C. Since it is impractical to cool down the getter-material before opening the chamber to air, a valve isolates the pump from the chamber between process cycles, as described below in greater detail. New pumps require an activation cycle to remove the reacted layer on the outer surfaces of the getter-material. Initial heating of the new pump to about 500 degrees C. for 30 to 60 minute diffuses the reacted surface into the bulk of the getter pellets. This initial heating process can be repeated whenever the pump 20 loses speed over time due to surface saturation, but this is only needed a few times during its lifetime. Although the bulk getter pump 20 requires no maintenance, the getter-material 44 has a finite lifetime. In normal operation, the getter-material lasts approximately six months to a year. When pump performance falls off, and reactivation via heating to, for example, 500 degrees C., no longer works, the getter-charge 44 is merely dumped out of the pump housing 20, and is replaced with a new, fresh charge.

The pump 20 is inherently clean and free of any vibration and noise. It is immune to particle ingestion problems. Its small size, low initial cost, low operating cost, and minimum of maintenance make it an ideal process pump for rough vacuum applications. The pump 20, being a rough vacuum pump, requires pre-pumping to at least 2 torr, before it is valved into operation. The pump 10, in its capacity as a roughing pump, is capable of pumping to pressures below $10^{-5}$ torr. In the smallest version of the pump 10, the getter-charge is contained within a 1½ in. diameter, tubular, stainless-steel housing that is provided with a metal sealed flange to allow de-mountable connection to a vacuum system or vacuum vale.

FIG. 4 is a schematic diagram showing the combination of a bulk-getter pump in combination with a mechanical roughing pump 80. The roughing pump 80 may be 4-stage diaphragm pumping unit manufactured by Danielson & Associates of Lisle, Ill., called "BARODYN". The "BARODYN" pump is essentially a roughing pump, since it is used in a different, but overlapping, pressure range than the pump 10. The pump 80 reduces the pressure in a vessel 82 to about 2 torr. At this pressure, the diaphragm pump portion 80 is valved off via valve 84 and the pump 10 is valved in via valve 86. The pump 10 then reduces the pressure to the pump's ultimate. In the case of the pump-down from air, the ultimate pressure will be limited to 10-30 millitorr. This is due to the percentage of argon (air contains 0.9% by volume of argon) that is left in the vessel being evacuated when the bulk getter-pump 10 is valved in. The pump 10 will not pump argon at all. If a chamber is filled with active gas such as nitrogen, the ultimate pressure will be $10^{-6}$ torr, or lower.

Since the combination of FIG. 4 uses the pump 10, it is capable of using different getter-material mixtures, with the operating temperatures and ultimate pressures achieved dependent upon the actual getter material or materials used. In general, though, the activation temperature will be about 500 degrees C., while the operating temperature will be higher than in the pump 10. Temperatures up to 500 degrees C. can be used depending upon the application.

The pump operates as follows. Before operation, all valves are closed. When the pump is turned on, the diaphragm portion 80 starts, and the valve to the diaphragm portion opens. The pressure is reduced in the vessel 82 until a pressure switch 88 senses its preset pressure, which is typically 2 torr. Then, the valve 84 to the diaphragm portion closes, and the diaphragm portion is turned off. The valve 86 to the bulk getter-pump portion 10 is opened, and the getter-material reduces the pressure to the pump's ultimate. The getter material in the pump 10 can be exposed to air only when it is cold. Therefore, a pump used in a process environment should be valved, so that it can be maintained at operating temperature at all times, avoiding time-consuming heat-up, cool-down cycles.

A smaller version 50 of the device is shown in FIG. 5, and has a pump 52 with a body housing 53 in which is received a cage 54 like that of the device 10. A main outer housing 56 surrounds the pump 52 and is provided with a connecting flange 60 that, like the flange 22 of the device 10, connects to a similar, mating flange of a conduit leading to a vacuum chamber or vessel to be pumped down and sustained at rough vacuum. The outer main housing 56 is preferably provided with holes or openings thereabout for air circulation. Owing to the relatively smaller size of the device 50 as compared with the device 10, no insulating material is needed, and the large, annular region for storing the insulating material is not required. Thus, instead of an annular coil or band heater of the device 10, the device 50 has a rectilinear-shaped heater unit 60 that is received in a central well 62 formed in the cage 54, which heater extends downwardly and out of the pump-housing 53, as seen in FIG. 5. The heater unit 60 also has a power cord (not shown) extending out of the main housing, as in the device 10. A control unit similar to the unit 37 may also be used for the device 50.

While a specific embodiment of the invention has been shown and described, it is to be understood that numerous changes and modifications may be made therein without departing from the scope, spirit and intent of the invention as set forth in the appended claims.

What I claim is:

1. In a vacuum chamber that is to be partially evacuated to a rough vacuum of between approximately 2 torr and $10^{-5}$ torr, the improvement comprising:
    a getter pump operatively coupled to said vacuum chamber for pumping down said vacuum chamber to a rough vacuum of between 2 torr and $10^{-5}$ torr;
    a mechanical roughing pump for initially pumping down said vacuum chamber; and valve means for alternately coupling said bulk getter-material pump and said mechanical roughing pump to said vacuum chamber to be pumped down; said valve means being operatively connected between said vacuum chamber to be pumped down and said pumps.

2. In a vacuum chamber that is to be partially evacuated to a rough vacuum of between approximately 2 torr and $10^{-5}$ torr, the improvement comprising:
   a getter pump operatively coupled to said vacuum chamber for pumping down said vacuum chamber to a rough vacuum of between 2 torr and $10^{-5}$ torr; said getter pump comprising:
   a bulk getter-material pump comprising a pump-body housing mounted, said pump-body housing comprising an interior;
   a cage-element mounted in said interior of said pump-body housing;
   a supply of bulk getter-material in said cage-element, said bulk getter-material comprising a plurality of separate getter-pellets;
   means for fluidly coupling said bulk getter-material pump to said vacuum chamber to be pumped down; and
   heating means operatively associated with said bulk getter-material pump for heating said supply of bulk-getter material.

3. The improvement according to claim 2, further comprising an outer housing comprising insulating material therein about said bulk getter-material pump for retaining the heat from said heating means.

4. The improvement according to claim 2, wherein said cage element is removably mounted in said interior for subsequent removal in order to place a new, fresh charge of bulk getter-material therein, said cage element comprising a central hollow cage-member, and an annular, hollow cage-member about said central cage-member; said bulk getter-material being stored in said annular, hollow cage-member.

5. The improvement according to claim 2, wherein said heating means comprises an exterior, annular coil-heating means circumferentially surrounding a portion of the circumference of said pump-body housing, and electrical power means connected to said coil-heating means for supplying electrical current thereto.

6. The improvement according to claim 2, wherein said cage-element serves as a heater-well receptacle; said heating means comprising a heater positioned in said heater-well receptacle; and power means exterior of said heater for powering said heater.

7. The improvement according to claim 2, wherein said pump-body housing comprises an open entrance mouth leading to said interior thereof; said means for fluidly coupling comprising an annular mounting flange about said pump-body housing at said entrance mouth; said vacuum chamber comprising a mounting flange and a conduit leading to the interior of said vacuum chamber; said annular flange of said means for fluidly coupling being coupled to said mounting flange of said vacuum chamber.

8. The improvement according to claim 7, further comprising an outer housing comprising a first, lower, larger-diameter portion and a second upper, smaller-diameter portion; said annular flange being peripherally encircled by a portion of said second portion; said second portion comprising clamping means for securing said annular flange therein.

* * * * *